United States Patent
Chun et al.

(10) Patent No.: US 11,355,251 B2
(45) Date of Patent: Jun. 7, 2022

(54) SYSTEM FOR SEPARATING AND COUPLING TOP NOZZLE OF NUCLEAR FUEL ASSEMBLY

(71) Applicants: Joo Hong Chun, Daejeon (KR); Seong Soo Kim, Daejeon (KR); Ba Leum Kim, Daejeon (KR); Su Pil Ryu, Daejeon (KR); Nam Gyu Park, Daejeon (KR); Jong Sung Yoo, Daejeon (KR)

(72) Inventors: Joo Hong Chun, Daejeon (KR); Seong Soo Kim, Daejeon (KR); Ba Leum Kim, Daejeon (KR); Su Pil Ryu, Daejeon (KR); Nam Gyu Park, Daejeon (KR); Jong Sung Yoo, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 0 days.

(21) Appl. No.: 16/870,699

(22) Filed: May 8, 2020

(65) Prior Publication Data
US 2020/0373032 A1    Nov. 26, 2020

Related U.S. Application Data

(63) Continuation of application No. PCT/KR2017/013117, filed on Nov. 17, 2017.

(30) Foreign Application Priority Data

Nov. 9, 2017   (KR) .......................... 10-2017-0148558

(51) Int. Cl.
  *G21C 3/334*   (2006.01)
  *G21C 3/33*    (2006.01)

(52) U.S. Cl.
  CPC ........... *G21C 3/334* (2013.01); *G21C 3/3315* (2013.01)

(58) Field of Classification Search
  CPC ........ G21C 3/33; G21C 3/331; G21C 3/3315; G21C 3/334; G21C 19/207; F16L 37/086; F16L 37/025; F16L 37/088
  (Continued)

(56) References Cited

U.S. PATENT DOCUMENTS 4,631,168 A * 12/1986 Shallenberger .......... G21C 3/33
                                                                   376/446
4,664,875 A *  5/1987 Shallenberger ........ G21C 3/334
                                                                   376/261
(Continued)

FOREIGN PATENT DOCUMENTS

EP        0362005 B1 *  6/1993 ............. G21C 3/334
KR   10-1999-0006474 A    1/1999
(Continued)

OTHER PUBLICATIONS

Machine Translation of EP-0362005-B1 (Year: 1993).*

*Primary Examiner* — Jack W Keith
*Assistant Examiner* — Jinney Kil
(74) *Attorney, Agent, or Firm* — Reinhart Boerner Van Deuren P.C.

(57) ABSTRACT

Disclosed is a system for separating and coupling a top nozzle of a nuclear fuel assembly. There is provided a lock insert configured to support the top nozzle of the nuclear fuel assembly by being coupled to a guide hole provided in a flow channel plate of the top nozzle, the lock insert including: a body in a hollow shape; and an insertion part provided on a top portion of the body and inserted into the guide hole, wherein a circumference of the insertion part is variable in size, thereby being capable of being inserted into the guide hole. Accordingly, disassembly and reassembly of the top (Continued)

nozzle of the nuclear fuel assembly and the lock insert are simplified, thereby simplifying and reducing the number of processes involved therein. Accordingly, the system is effective for maintenance and repair of the nuclear fuel assembly.

1 Claim, 6 Drawing Sheets

(58) Field of Classification Search
USPC .......................................................... 376/446
See application file for complete search history.

(56) References Cited

U.S. PATENT DOCUMENTS

| | | | | |
|---|---|---|---|---|
| 4,919,881 A | * | 4/1990 | Hankinson .............. | G21C 19/02 |
| | | | | 376/260 |
| 5,479,464 A | * | 12/1995 | DeMario ................ | G21C 3/334 |
| | | | | 376/364 |
| 5,559,843 A | * | 9/1996 | Amiet .................... | G21C 3/334 |
| | | | | 376/261 |
| 2013/0058449 A1 | | 3/2013 | Johansson | |

FOREIGN PATENT DOCUMENTS

| | | |
|---|---|---|
| KR | 10-0352200 B1 | 12/2002 |
| KR | 10-2006-0129231 A | 12/2006 |
| KR | 10-1162002 B1 | 7/2012 |
| WO | WO 2013/172488 A1 | 11/2013 |

* cited by examiner

- prior art -

- prior art -

- prior art -

SYSTEM FOR SEPARATING AND COUPLING TOP NOZZLE OF NUCLEAR FUEL ASSEMBLY

CROSS REFERENCE TO RELATED APPLICATION

The present application is a continuation of PCT Application No. PCT/KR2017/013117, filed Nov. 17, 2017, which claims priority to Korean Patent Application No. 10-2017-0148558, filed Nov. 9, 2017, the entire contents of which is incorporated herein for all purposes by this reference.

TECHNICAL FIELD

The present invention relates generally to a system for separating and coupling a top nozzle of a nuclear fuel assembly and, more particularly, to a fastening structure of a top nozzle and a lock insert for improving a performance of disassembling and reassembling the top nozzle of a nuclear fuel assembly.

BACKGROUND ART

A nuclear reactor is a device made to be used for various purposes such as generating heat by artificially controlling a fission chain reaction of fissile material, producing radioisotopes and plutonium, or forming a radiation field.

More specifically, in typical light water reactors, enriched uranium that has a ratio of uranium-235 increased to 2-5% is used. In order for nuclear fuel to be used in nuclear reactors, uranium is processed into cylindrical pellets weighing about 5 g. Such pellets are charged into a zircaloy cladding tube, then one spring and helium gas are inserted into the cladding tube, and then a fuel rod is manufactured by welding an upper end cap of the cladding tube. The fuel rods finally form a nuclear fuel assembly and are burned by nuclear reactions in the reactor.

FIG. 1 is a view showing a typical nuclear fuel assembly. With reference to FIG. 1, a nuclear fuel assembly 1 includes a skeleton, which is composed of a top nozzle 2, a bottom nozzle 4, spacer grids 6, guide thimbles 8, an instrumentation tube 12, and the like, and fuel rods inserted into and supported by the spacer grids 6.

The spacer grids 6 are arranged in the nuclear fuel assembly 1 in a number of about 10 to 13 from an upper side to a lower side and are welded with the guide thimbles 8 having a length of 4 m. Assembling the nuclear fuel assembly 1 is completed by charging the fuel rods into the skeleton and then attaching and fixing the top nozzle 2 and the bottom nozzle 4. In other words, the nuclear fuel assembly 1 is arranged such that the fuel rods are maintained at a constant distance between the top nozzle 2 and the bottom nozzle 4 by the spacer grids 6 and the guide thimbles 8 as shown in FIG. 1.

FIG. 2 is a view illustrating a typical top nozzle 2. With reference to FIG. 2, the top nozzle 2 includes a flow channel plate 24, and the flow channel plate 24 includes a instrumentation fixing hole 26 to which the instrumentation tube is fixed, guide holes 22 to which top nozzle is coupled, and flow channel holes 28 through which coolant flows.

During the operation of the reactor, hydraulic uplift force due to the flow of coolant may be applied to the nuclear fuel assembly 1, thereby causing the assembly to be raised or vibrated. In addition, the nuclear fuel assembly may be subjected to an axial length change due to thermal expansion by an increase in temperature or due to irradiation growth and creep of the nuclear fuel cladding tube by long-term neutron irradiation. At this time, the top nozzle 2 is coupled to the guide thimbles to support a load of an axial direction, thereby functioning to maintain mechanical and structural stability of the nuclear fuel assembly.

On the other hand, the guide thimbles are usually coupled to the flow channel plate 24 together with the top nozzle insert to be firmly coupled to the flow channel plate 24 and are configured to be engaged into the top nozzle insert by a bulging process while coupling the top nozzle insert to the flow channel plate 24.

FIG. 3 is a view showing an above-mentioned fastening structure of the top nozzle and the top nozzle insert generally used. The fastening structure 30 of the top nozzle and the top nozzle insert is configured such that the top nozzle insert 31 is inserted into the guide hole 22 provided in the flow channel plate 24 at a side below the guide hole 22, and in order to prevent the coupling of the top nozzle insert from being released, a lock tube 33 is inserted into an inner circumferential surface of the top nozzle insert at a side above the guide hole 22, thereby being fastened.

However, when the top nozzle and the guide thimbles are separated from each other in a state of the above-described conventional configuration, it is not easy to dismantle and difficult to work remotely, because the top nozzle insert 31 and the lock tube 33 are provided being inserted into the guide hole 22 of the flow channel plate.

DISCLOSURE

Technical Problem

Accordingly, the present invention has been made to solve the above-described problems, and an object thereof is to provide a fastening structure of a top nozzle and a lock insert for improving a performance of disassembling and reassembling the top nozzle of a nuclear fuel assembly.

Technical Solution

In order to accomplish the above objective, there may be provided a system for separating and coupling a top nozzle of a nuclear fuel assembly according to the present invention, the system including: a lock insert configured to support the top nozzle of the nuclear fuel assembly by being coupled to a guide hole provided in a flow channel plate of the top nozzle, wherein the lock insert may include: a body in a hollow shape, and an insertion part provided on a top portion of the body and configured to be inserted into the guide hole, wherein a circumference of the insertion part may be variable in size, thereby being capable of being inserted into the guide hole.

The guide hole may include: a latching step provided at an upper portion of an inner circumferential surface of the guide hole and configured to fix the lock insert; and a latching groove provided at a predetermined portion of the inner circumferential surface of the guide hole and configured to fix the lock insert.

In addition, the insertion part may include: a first latching member fixed by being brought into contact with the latching step; and a second latching member fixed by being brought into contact with the latching groove.

The insertion part may be provided with at least one predetermined interval along a circumferential direction of the insertion portion, and the circumference of the insertion part may be variable in size as much as the predetermined interval.

The insertion part may be provided with at least one insertion member at a predetermined interval along a circumferential direction of the insertion portion, and the circumference of the insertion part may be variable in size as much as the predetermined interval.

Meanwhile, the system may further include: a separation part configured to separate the top nozzle and the lock insert from each other, wherein the separation part comprises a separation member configured to separate the lock insert from the guide hole and a fixing member configured to fix and lift the top nozzle.

In addition, the separation member may provide a predetermined accommodation space, and one side of the insertion part of the lock insert may be inserted into the accommodation space, whereby the circumference of the insertion part of the lock insert may be variable in size.

In addition, one end of the fixing member may be provided with a fixing latching member to be brought into contact with a bottom surface of the flow channel plate, thereby lifting the top nozzle.

Advantageous Effects

As described above, according to the present invention, disassembly and reassembly of the top nozzle of the nuclear fuel assembly and the lock insert are simplified, thereby simplifying and reducing the number of processes involved therein. Accordingly, the system is effective for maintenance and repair of the nuclear fuel assembly.

In addition, the number of parts is reduced to increase the handleability, so that it is easy to work remotely for repairing a nuclear fuel assembly.

In addition, it is possible to prevent the parts from being broken away from each other during the work for coupling and disassembling of the top nozzle and the guide thimble.

The effects of the present invention are not limited to those described above, and other effects not mentioned will be clearly recognized by those skilled in the art from the following description.

DETAILED DESCRIPTION

Hereinafter, with reference to the drawings will be described the present invention in more detail. It should be noted that the same elements in drawings are denoted by the same numerals wherever possible. In addition, descriptions of well-known functions and configurations that may unnecessarily obfuscate the subject matter of the present invention will be omitted.

In addition, various changes may be made to the embodiments described below. The examples described below are not intended to be limiting the embodiments but should be understood to include all modifications, equivalents, and substitutes therefor.

In addition, that a circumference of an insertion part of the present invention may be variable in size implies that the circumference is varied in the size by applying external force to an outer surface of a first latching member. For the convenience of description, size of a circumference of an insertion part or size of a circumference of the first latching member is used according to each of the embodiments of the invention, but each of the above should be understood to mean the size of the same circumference.

Herebelow, descriptions will be given logically according to the drawings.

Figure 1:
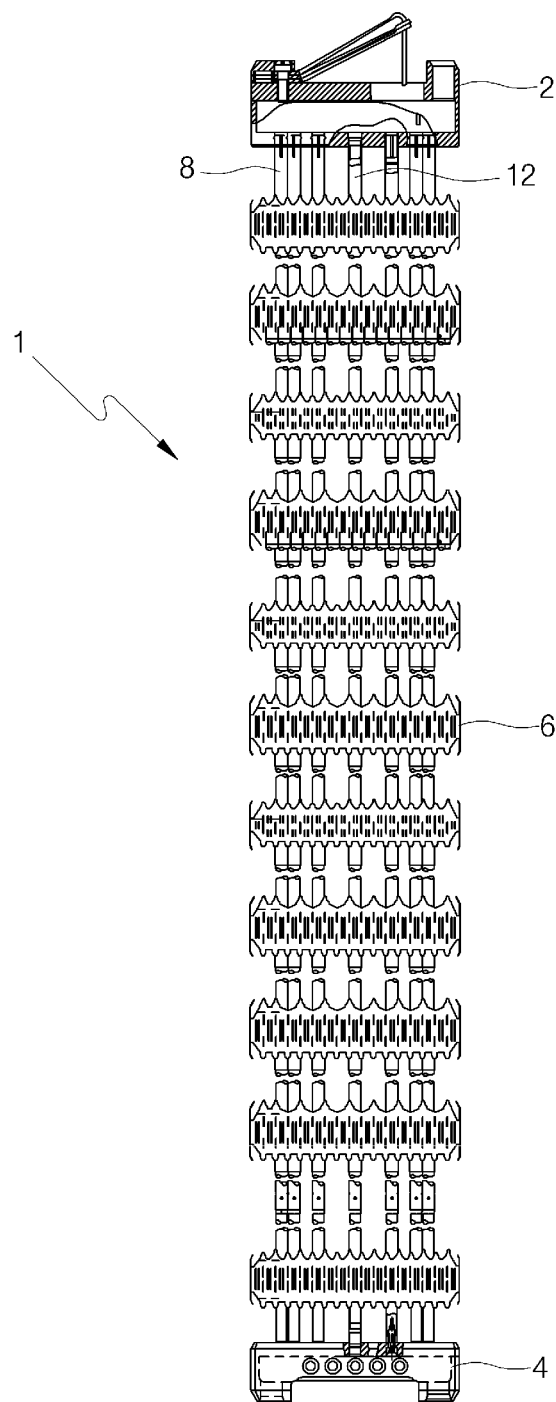
FIG. 1 is a view showing an overall configuration of a typical nuclear fuel assembly.
Figure 2:
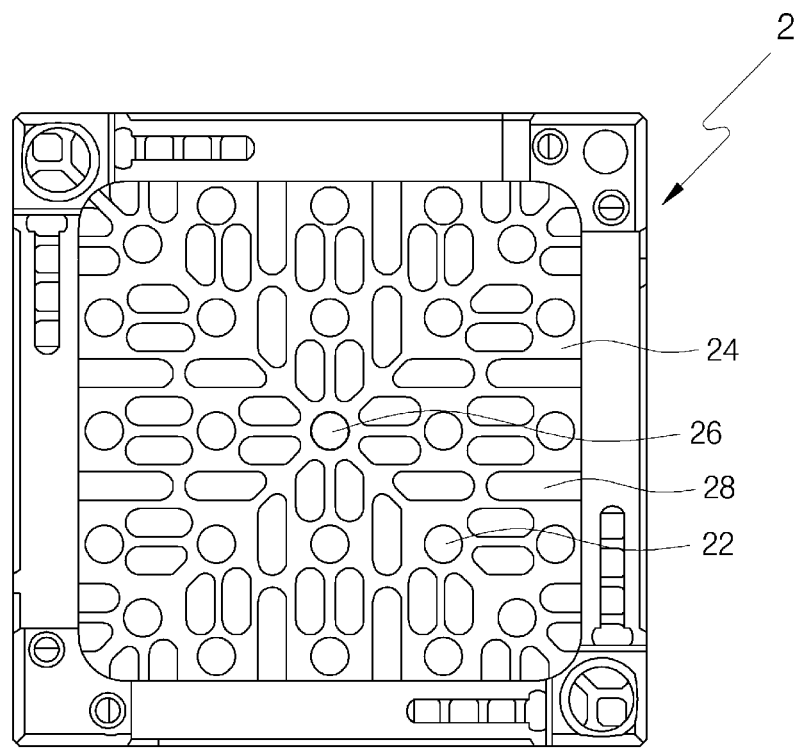
FIG. 2 is a view showing a top nozzle of a typical nuclear fuel assembly.
Figure 3:
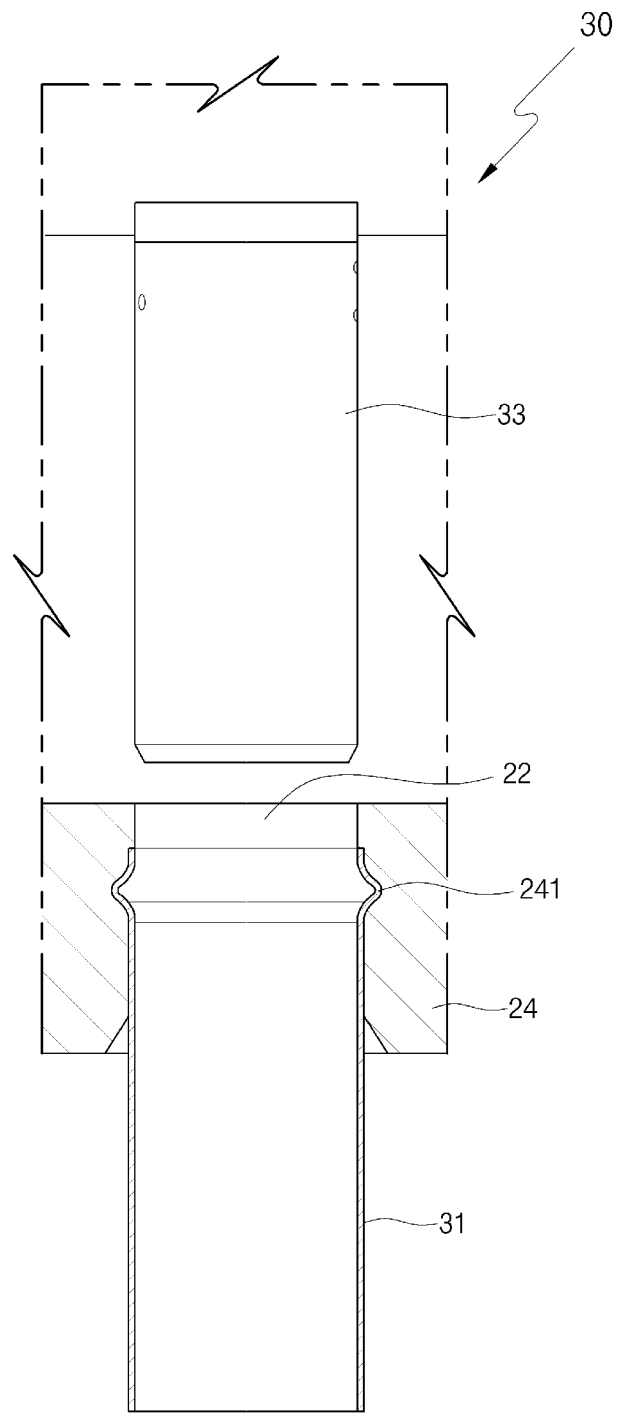
FIG. 3 is a view showing a fastening structure of the top nozzle and a lock insert of a typical nuclear fuel assembly.
Figure 4:
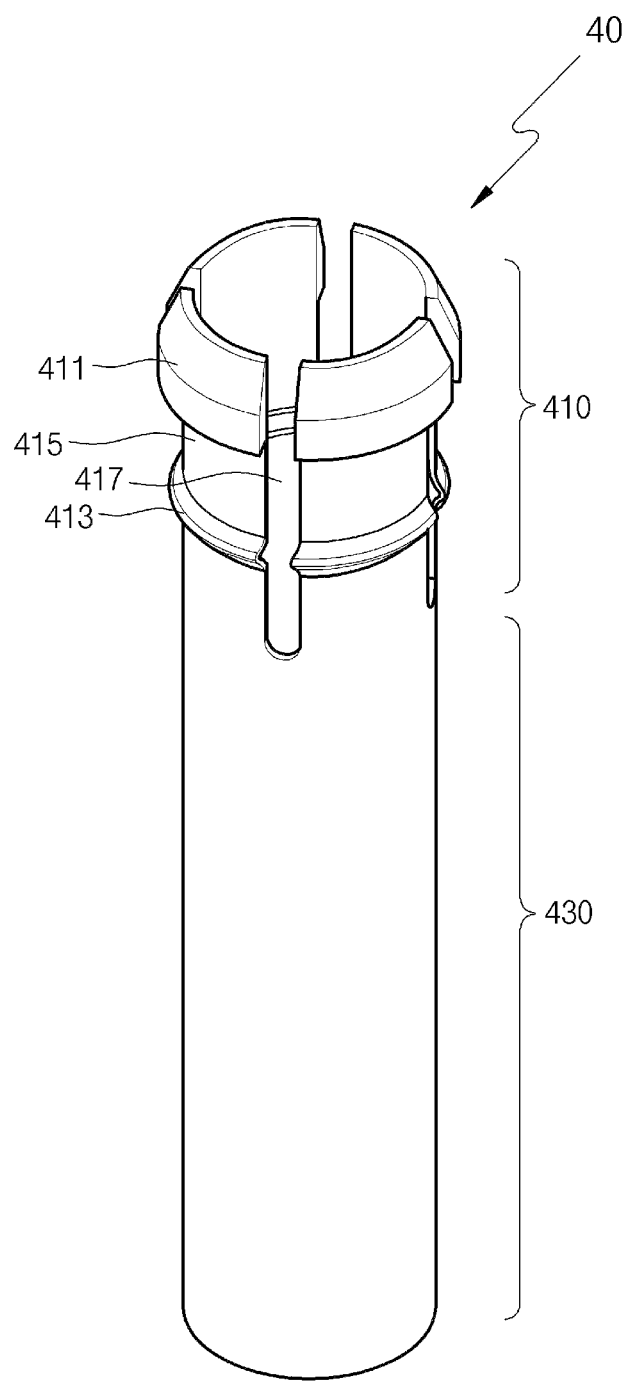
FIG. 4 is a view showing a lock insert of a system for separating and coupling a top nozzle of a nuclear fuel assembly according to an embodiment of the present invention.

FIG. 2 is a view showing a top nozzle of a typical nuclear fuel assembly, and FIG. 4 is a view showing a lock insert of a system for separating and coupling a top nozzle of a nuclear fuel assembly according to an embodiment of the present invention.

With reference to FIG. 2, the top nozzle 2 of the typical nuclear fuel assembly includes a guide hole 22, a flow channel plate 24, an instrumentation fixing hole 26, and a flow channel hole 28, and is configured to be a structure in which such holes are provided in the flow channel plate 24. Hereinafter, descriptions overlapping with the above description with respect to each of components will be omitted.

With reference to FIG. 4, the lock insert 40 of the present embodiment includes an insertion part 410 and a body 430, wherein the insertion part 410 includes a first latching member 411, a second latching member 413, and an insertion member 415.

On the other hand, taking a look at each of the components or coupling between the components, the body 430 is provided in a hollow shape for supporting the top nozzle, and the insertion part 410 is provided on a top portion of the body 430, thereby being inserted into the guide hole 22.

More specifically, the circumference of the insertion part 410 is configured to be variable in the size, thereby being inserted into the guide hole 22. Therefore, the insertion part 410 may be made of an elastic material so that the circumference thereof may vary in the size or may be configured to have a structure in which at least one predetermined interval 417 is provided, whereby the circumference of the insertion part is variable in size as much as the predetermined interval 417. Alternatively, the insertion part 410 may be configured to have a structure in which at least one insertion member 415 is provided at a predetermined interval 417 along the circumferential direction, whereby the circumference of the insertion part is varied in the size as much as the predetermined intervals 417 between the insertion members 415.

On the other hand, according to the above-described configuration of the present embodiment, the circumference of the insertion part 410 of the lock insert 40 is variable in the size, whereby the insertion part is easily inserted into the guide hole 22. Here, the first latching member 411 is provided at one side of the insertion part 410, and the second latching member 413 is provided at a middle portion of the insertion part 410. Accordingly, the insertion part is inserted into the guide hole 22, thereby fixing the lock insert 40 to the flow channel plate 24.

In addition, disassembly of the lock insert 40 from the flow channel plate 24 may also be performed by varying the size of the circumference of the insert part 410 and then by lifting the body 430 or the top nozzle 2.

Figure 5:
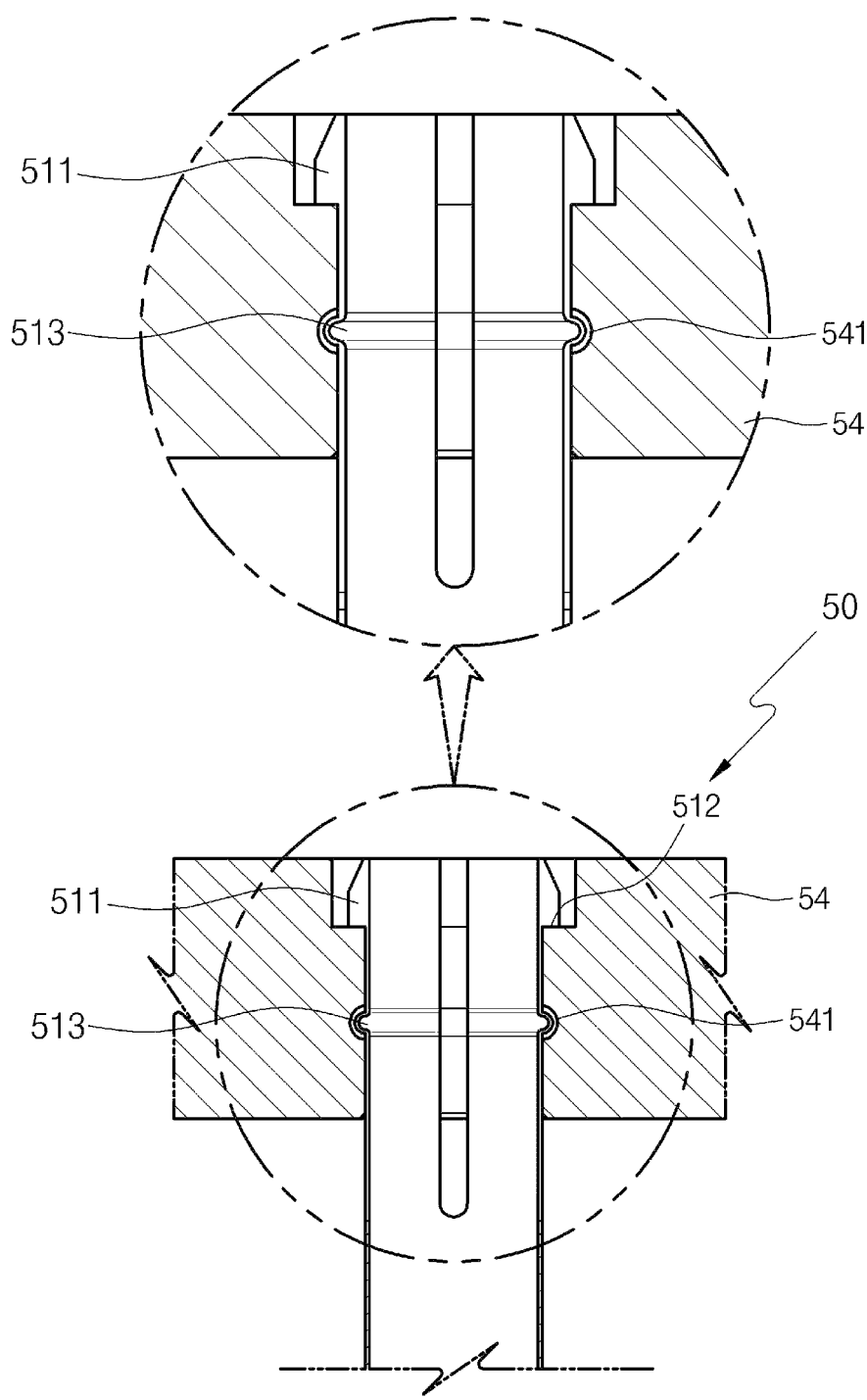
FIG. 5 is a view showing a fastening structure of a lock insert of the system for separating and coupling a top nozzle of a nuclear fuel assembly according to an embodiment of the present invention.

FIG. 5 is a view showing a fastening structure of a lock insert of a system for separating and coupling a top nozzle of a nuclear fuel assembly according to an embodiment of the present invention.

With reference to FIG. 5, the fastening structure 50 of the lock insert of the present embodiment includes a first latching member 511, a second latching member 513, a latching step 512, and a latching groove 541. More specifically, the latching step 512 is provided at an upper portion of an inner circumferential surface of a guide hole, and the latching groove 541 is provided at a predetermined portion of the inner circumferential surface of the guide hole.

Taking a look at each of the above-described components or coupling between the components, the first latching member 511 is brought into contact with the latching step 512 provided at the upper portion of the inner circumferential surface of the guide hole, thereby fixing a flow channel plate 54, and the second latching member 513 is brought into contact with the latching groove 541 provided at the predetermined portion of the inner circumferential surface of the guide hole, thereby fixing the flow channel plate 54.

In addition, the latching step 512 has a size of a circumference greater than a size of a circumference provided by the first latching member 511. By using a space provided due to a difference of the above-mentioned circumferences between an outer circumferential surface of the first latching member 511 and an inner circumference of the latching step 512, the size of the outer circumference of the first latching member 511 may be varied, thereby allowing the lock insert and the flow channel plate 54 to be separated from each other.

In addition, a surface that the first latching member 511 and the latching step 512 are brought into contact with each other may be provided in a range that does not restrict to vary the size of the circumference of the first latching member 511 by applying external force to an outer side of the first latching member 511. That is, the first latching member 511 may include various shapes each of which does not act as an element restricting a variation of the size of the circumference of the first latching member 511.

Figure 6:
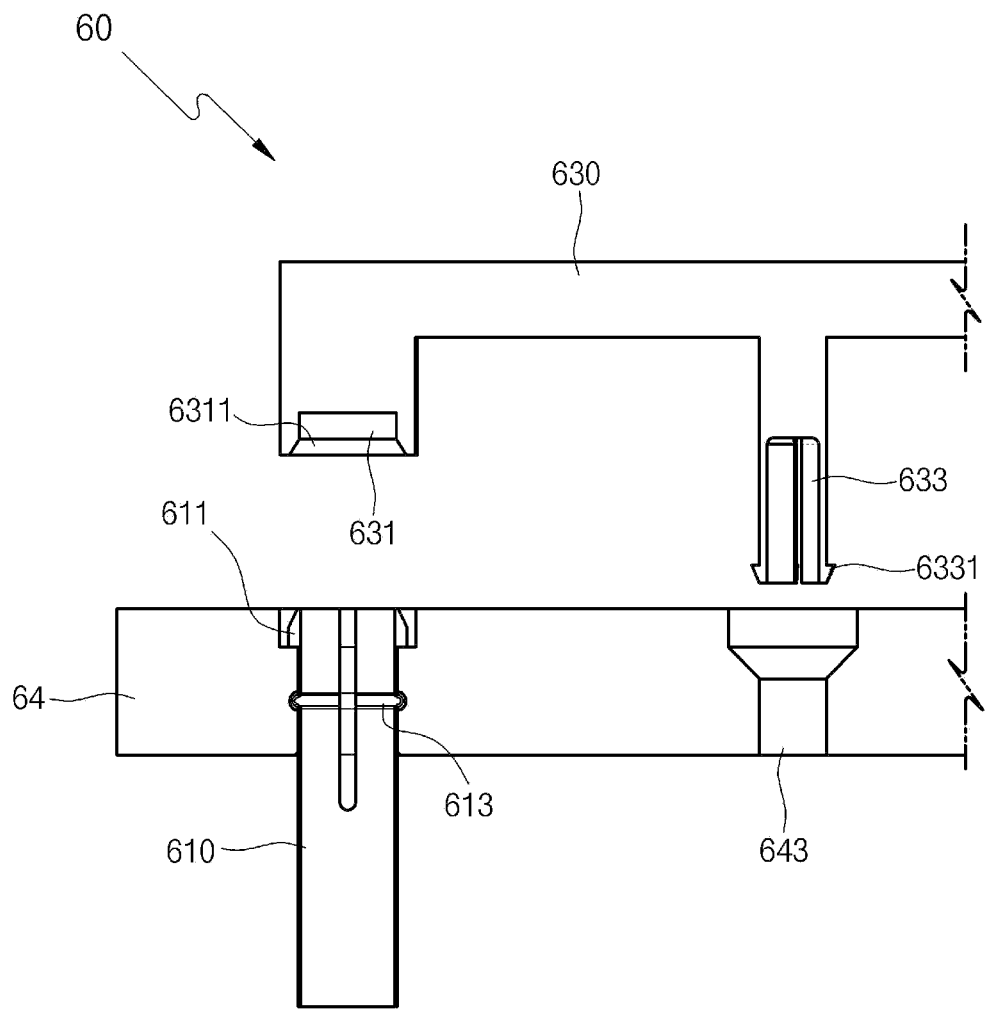
FIG. 6 is a view showing an overall configuration of a system for separating and coupling a top nozzle of a nuclear fuel assembly according to an embodiment of the present invention.

FIG. 6 is a view showing an overall configuration of a system for separating and coupling a top nozzle of a nuclear fuel assembly according to an embodiment of the present invention.

With reference to FIG. 6, the system 60 of the present embodiment includes an insertion part 610, a separation part 630, and a flow channel plate 64, of the lock insert. More specifically, the insertion part 610 may include a first latching member 611 and a second latching member 613, the separation part 630 may include a separation member 631, a fixing member 633, and a fixing latching member 6331, and the flow channel plate 64 may include a fixing hole 643.

Taking a Look at each of the above-described components or coupling between the components, the insertion part 610 is inserted penetrating through a guide hole provided in the flow channel plate 64, wherein the first latching member 611 is brought into contact with a latching step provided at an upper portion of the inner circumferential surface of the guide hole, thereby fixing the flow channel plate 64, and the second latching member 613 is brought into contact with a latching groove provided at a predetermined portion of the inner circumferential surface of the guide hole, thereby fixing the flow channel plate 64.

The separation part 630 is inserted into the guide hole and the fixing hole 643 provided in the flow channel plate 64, wherein the separation member 631 is configured to provide a space 6311 accommodating the outer circumferential surface of the first latching member 611 provided at an upper portion of the inner circumferential surface of the guide hole of the flow channel plate 64. That is, when the structure of the first latching member 611 is changed to an extent that may be embodied by those skilled in the art, the internal space 6311 of the separation member 631 may also have a different shape accordingly.

In addition, the inner space 6311 of the separation member 631 may have at least one inclination on an inner circumferential surface thereof and size of the circumference of the inner space 6311 may include a shape having the circumference of at least one size according to the inclination.

In addition, the fixing member 633 is inserted penetrating through the fixing hole 643 and allows the fixing latching member 6331 and a bottom surface of the flow channel plate 64 to be brought into contact with each other, thereby fixing the flow channel plate 64 and the separation part 630 to each other.

Meanwhile, according to the above-described configuration of the present embodiment, the separation member 631 applies external force to the outer circumferential surface of the first latching member 611 while accommodating the outer circumferential surface of the first latching member 611. As the external force is applied to the outer circumferential surface of the first latching member 611, size of a circumference of the insertion part 610 may be varied to release the coupling between the lock insert and the flow channel plate 64.

The separation member 631 may have different sizes of the inner circumference thereof due to the inclination, and the user may specify a variable size of the circumference of the insertion part 610 such that the separation member 631 accommodates the outer circumferential surface of the first latching member 611 by the different sizes of the circumference.

As the separation part 630 is lowered, coupling of the lock insert and the flow channel plate 64 is released by the separation member 631, and the fixing member 633 is inserted penetrating through the fixing hole 643, whereby the fixing latching member 6331 is brought into contact with a bottom surface of the flow channel plate 64 and fixed.

In addition, as the separation part 630 is lifted, the flow channel plate 64 is lifted together by the fixing member 633 and the fixing hole 643, whereby separation and removal of the lock insert and the flow channel plate 64 may be performed at the same time.

On the other hand, the present invention is not limited to the embodiments and the accompanying drawings in the above description, and it will be obvious for those skilled in the art that various substitutions, modifications, and changes are possible within the scope without departing from the spirit of the present invention.

<Description of the Reference Numerals in the Drawings>

| | |
|---|---|
| 1: Nuclear fuel assembly | 2: Top nozzle |
| 4: Bottom nozzle | 6: Spacer grid |
| 8: Guide thimble | 12: Instrumentation tube |
| 22: Guide hole | 24, 54, 64: Flow channel plate |
| 241: Groove | 26: Instrumentation fixing hole |

-continued

<Description of the Reference Numerals in the Drawings>

| | |
|---|---|
| 28: Flow channel hole | 30: Fastening structure |
| 31: Top nozzle insert | 33: Lock tube |
| 40: Lock insert | 410, 610: insertion part |
| 411, 511, 611: First latching member | 413, 513, 613: second latching member |
| 415: Insertion member | 430: Body |
| 50: Fastening structure of lock insert | 541: Latching groove |
| 60: System for separating and coupling top nozzle of nuclear fuel assembly | |
| 630: Separation part | 631: separation member |
| 633: Fixing member | 6331: Fixing latching member |
| 643: Fixing hole | |

The invention claimed is:

1. A system for separating and coupling a top nozzle having a flow channel plate with guide holes and a fixing hole formed thereto, from/to a nuclear fuel assembly with guide thimbles, the system comprising:
   a lock insert configured to couple the guide thimbles of the nuclear fuel assembly to the flow channel plate of the top nozzle by being inserted into the guide holes provided in the flow channel plate of the top nozzle; and
   a separation part configured to separate the lock insert from the flow channel plate of the top nozzle,
   wherein the lock insert comprises a body in a hollow shape, and an insertion part provided on a top of the body and configured to be inserted into the guide holes, the insertion part comprising:
      a first latching member having a step, being fixed by being brought into contact with a latching step; and
      a second latching member having a projection, being fixed by being brought into contact with a latching groove,
   the insertion part being provided with at least one slot at a predetermined interval along a circumference of the insertion part to make the size of the circumference variable,
   the guide holes comprising:
      the latching step provided at an upper portion of an inner circumferential surface of the guide holes and configured to fix the lock insert; and
      the latching groove provided at a predetermined portion of the inner circumferential surface of the guide holes and configured to fix the lock insert,
   wherein engagement of the first and second latching members with the latching step and latching groove alone locks the nuclear fuel assembly to the top nozzle,
   wherein the separation part comprises a separation member configured to release the coupling of the lock insert and the flow channel plate, and a fixing member configured to be engaged with a bottom surface of the flow channel plate through the fixing hole of the flow channel plate, wherein as the separation part is lowered, the coupling of the lock insert and the flow channel plate is released by the separation member and the fixing member is engaged with the bottom surface of the flow channel plate at the same time; and then as the separation part is lifted, the lock insert remains released from the flow channel plate and the flow channel plate of the top nozzle is lifted in engagement with the fixing member at the same time,
   wherein the separation member has a predetermined accommodation space formed therein to accommodate one side of the insertion part of the lock insert, and when the one side of the insertion part of the lock insert is inserted into the predetermined accommodation space, a surface of the separation member defining the accommodation space applies a force to the one side of the insertion part, thereby the size of the circumference of the insertion part is reducibly variable by the force and then the coupling between the lock insert and the flow channel plate is released, and
   wherein one end of the fixing member is provided with a fixing latching member having a step to be engaged with the bottom surface of the flow channel plate, thereby the flow channel plate of the top nozzle is lifted as the separation part is lifted.

* * * * *